(12) United States Patent
Johnson et al.

(10) Patent No.: US 11,911,721 B2
(45) Date of Patent: Feb. 27, 2024

(54) FUEL FILTRATION SYSTEM

(71) Applicant: Cummins, Inc., Columbus, IN (US)

(72) Inventors: Paul D. Johnson, Minneapolis, MN (US); Gregory S. Franks, Edinburgh, IN (US); Joseph A. Worthington, Scipio, IN (US); Sandesh R. Patil, Pune (IN); Amit Yeole, Columbus, IN (US); David P. Genter, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 25 days.

(21) Appl. No.: 15/503,585

(22) PCT Filed: Aug. 10, 2015

(86) PCT No.: PCT/US2015/044460
§ 371 (c)(1),
(2) Date: Feb. 13, 2017

(87) PCT Pub. No.: WO2016/025384
PCT Pub. Date: Feb. 18, 2016

(65) Prior Publication Data
US 2018/0214802 A1    Aug. 2, 2018

(30) Foreign Application Priority Data

Aug. 14, 2014 (IN) .......................... 3996/CHE/2014

(51) Int. Cl.
*B01D 35/157* (2006.01)
*B01D 35/12* (2006.01)
(Continued)

(52) U.S. Cl.
CPC .......... *B01D 35/157* (2013.01); *B01D 29/50* (2013.01); *B01D 35/12* (2013.01); *F16K 1/34* (2013.01); *F16K 31/02* (2013.01)

(58) Field of Classification Search
None
See application file for complete search history.

(56) References Cited

U.S. PATENT DOCUMENTS 3,915,866 A * 10/1975 Brown ................... B01D 35/12
210/341
6,159,383 A   12/2000 Gullett et al.
(Continued)

FOREIGN PATENT DOCUMENTS

DE    89 07 211       7/1989
WO    WO-00/18488    4/2000

OTHER PUBLICATIONS

"Parker Hannifin Corporation, Mobile Accessory Valves Catalog HY14-2405/US, copyright 2004, p. 7-8" (Year: 2004).*
(Continued)

*Primary Examiner* — Benjamin M Kurtz
(74) *Attorney, Agent, or Firm* — Foley & Lardner LLP

(57) ABSTRACT

A fuel filtration system and methods controlling, and operating a fuel filtration system. A first fuel filter head is fluidly coupled to one or more first fuel filters, a second fuel filter head is fluidly coupled to one or more second fuel filters and a selector valve is coupled to the first fuel filter head and the second fuel filter head. The selector valve includes a primary valve inlet port, a primary valve outlet port, and a movable valve body movable from a first position to a second position. The first position fluidly couples the first fuel filter head to the primary valve outlet port and fluidly decouples the second fuel filter head from the primary valve outlet port. The second position fluidly couples the second fuel filter head to the primary valve outlet port and fluidly decouples the first fuel filter head from the primary valve outlet port.

14 Claims, 8 Drawing Sheets

(51) Int. Cl.
*B01D 29/50* (2006.01)
*F16K 1/34* (2006.01)
*F16K 31/02* (2006.01)

(56) References Cited

U.S. PATENT DOCUMENTS

| | | | |
|---|---|---|---|
| 6,474,289 B1 | 11/2002 | Lilly et al. | |
| 7,569,143 B2 * | 8/2009 | Blizard | F02M 37/22 |
| | | | 210/232 |
| 2003/0010697 A1 * | 1/2003 | Sann | B01D 29/23 |
| | | | 210/234 |
| 2004/0045609 A1 | 3/2004 | Apostolides | |
| 2004/0211395 A1 | 10/2004 | Greco et al. | |
| 2009/0095689 A1 | 4/2009 | Keenan | |
| 2010/0154754 A1 * | 6/2010 | Ringenberger | B01D 35/301 |
| | | | 123/516 |
| 2012/0006763 A1 | 1/2012 | Desai | |

OTHER PUBLICATIONS

Extended European Search Report for EP Application No. 15831516.8, dated Mar. 9, 2018, 10 pages.
International Preliminary Report on Patentability for PCT Patent Application No. PCT/US2015/044460, dated Feb. 14, 2017, 7 pages.
International Search Report for PCT Patent Application No. PCT/US2015/44460, dated Nov. 2, 2015, 2 pages.
Office Action in CN App. No. 202010172414.8 dated Dec. 31, 2021 and partial English machine translation.
"Hydraulic Transmission and Control Manual", Qisong Chen, pp. 889-890, Shanghai Science and Technology Press, 2006 and partial English machine translation.

* cited by examiner

FUEL FILTRATION SYSTEM

CROSS REFERENCE TO RELATED APPLICATIONS

The present application claims the benefit of priority to Indian Provisional Patent Application No. 3996/CHE/2014, filed Aug. 14, 2014, and the contents of which are incorporated herein by reference in its entirety.

TECHNICAL FIELD

This disclosure relates to fuel filtration systems for internal combustion engines.

BACKGROUND

Fuel filtration systems impact the fuel economy, performance, emissions, and operation of an internal combustion engine. In some systems, such as high horse power engines, even exceptionally small contaminant particles in the fuel supply can cause unacceptable wear or failure of critical fuel systems components. Shutting down such systems for unplanned repairs or replacement of these components can be difficult, time consuming and costly. For example, engines such as high horsepower engines, are generally shut down and started according to specific protocols. If, for example, a high horsepower engine shuts down in a hot condition (also known as a hot shutdown), for example due to a part failure, the engine may require a significant cooling period before the engine may be restarted without posing a significant risk of damage to the power cylinders upon an engine restart. Additionally, because such engine systems may be operating in remote locations, repairing or replacing fuel filtration components may be challenging, as it may be difficult to unexpectantly schedule and implement a service call.

SUMMARY

Various embodiments provide fuel filtration systems and methods of controlling, manufacturing, and operating fuel filtration systems. The fuel filtration system includes a first fuel filter head fluidly coupled to one or more first fuel filters, a second fuel filter head fluidly coupled to one or more second fuel filters and a selector valve coupled to the first fuel filter head and the second fuel filter head. The selector valve includes a primary valve inlet port, a primary valve outlet port, and a movable valve body movable from a first position to a second position. The first position fluidly couples the first fuel filter head to the primary valve outlet port and fluidly decouples the second fuel filter head from the primary valve outlet port. The second position fluidly couples the second fuel filter head to the primary valve outlet port and fluidly decouples the first fuel filter head from the primary valve outlet port.

In other embodiments, a fuel filtration system is provided that includes a first fuel filter head fluidly coupled to one or more first fuel filters, a second fuel filter head fluidly coupled to one or more second fuel filters, and a selector valve coupled to the first fuel filter head and the second fuel filter head. The selector valve includes a primary valve inlet port, a primary valve outlet port, and a movable valve body configured to selectably fluidly couple at least one of the first filter head and the second fuel filter head to the primary valve outlet port.

Still further embodiments provide a method of operating a fuel filtration system. The method includes moving a valve body of a selector valve from a first position to a second position. The valve body includes a primary valve inlet port, a primary valve outlet port, and a movable valve body, fluidly coupling a first fuel filter head to the primary valve outlet port and fluidly decoupling a second fuel filter head from the primary valve outlet port. The second position fluidly couples the second fuel filter head to the primary valve outlet port and fluidly decouples the first fuel filter head from the primary valve outlet port. The first fuel filter head is fluidly coupled to one or more first fuel filters. The second fuel filter head is fluidly coupled to one or more second fuel filters. The method further includes, in response to moving the valve body of the selector valve from the first position to the second position, pumping fuel from a fluid tank into the primary valve inlet port of the valve body and out of the primary valve outlet port of the valve body, through the second fuel filter head and the one or more second fuel filters.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive fuel filtration systems and methods of controlling and operating fuel filtration systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
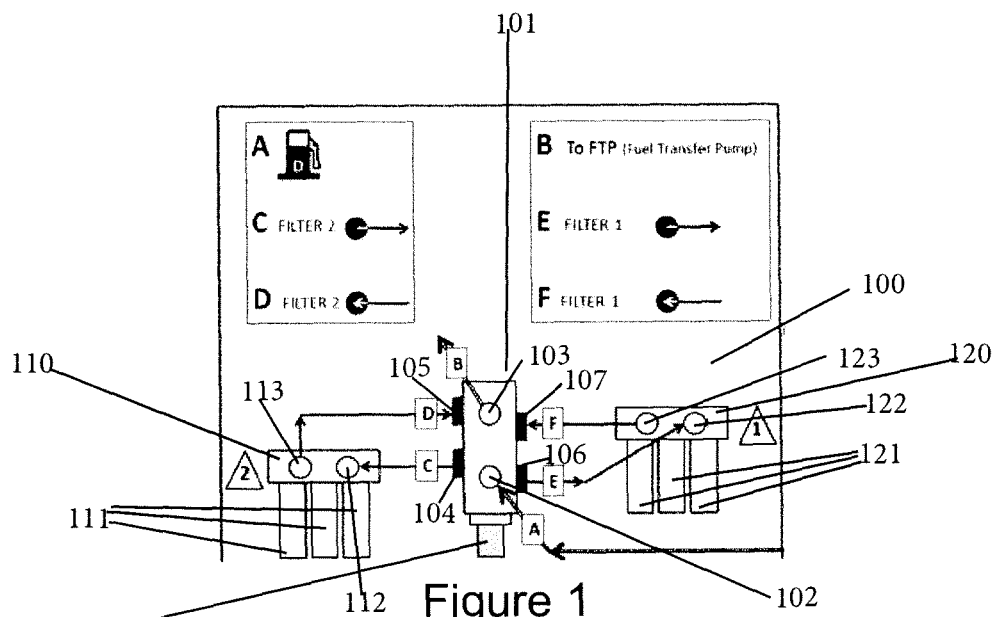
FIG. 1 is a schematic of the fuel filtration system, in accordance with example embodiments.

FIG. 1 is a schematic of the fuel filtration system, in accordance with example embodiments. A fuel filtration system 100 includes a selector valve 101 having a primary valve inlet port 102 and a primary valve outlet port 103. The selector valve 101 includes a valve actuator 108. The selector valve 101 is configured to selectably fluidly couple a first fuel filter head 110 and a second fuel filter head 120 to the primary valve outlet port 103. The fuel filtration system 100 receives fuel from a fuel source such as a fuel storage tank, which may include a diesel storage tank. The fuel from the storage tank is filtered by a first bank of fuel filters 111 and/or a second bank of fuel filters 121 before being transferred to a secondary filtration system, a fuel rail, or fuel injectors in an internal combustion engine via a fuel transfer pump (also known as a fuel supply pump). In order to filter fuel entering the selector valve 101 via the primary valve inlet port 102 before the fuel is into pumped to the internal combustion engine, the fuel entering the primary valve inlet port 102 is routed by a valve body positioned in the selector valve 101. The valve body routes the fuel through one of fuel filtration outlets 104, 106 so that the fuel enter one of the fuel filter heads 110, 120 via fuel filter head inlets 112, 122 travels through one of the fuel filters 111, 121, exits the respective fuel filter heads 110, 120 via corresponding fuel filter head outlets 113, 123 and returns back into the selector valve 101 via the respective fuel filtration inlet 105, 107. The filtered fuel returning back into the selector valve 101 via one of the fuel filtration inlets 105, 107 is pumped or drawn out of the selector valve 101 through the primary valve outlet port for transmission into an internal combustion engine, for example via a fuel transfer pump.

Figure 2:
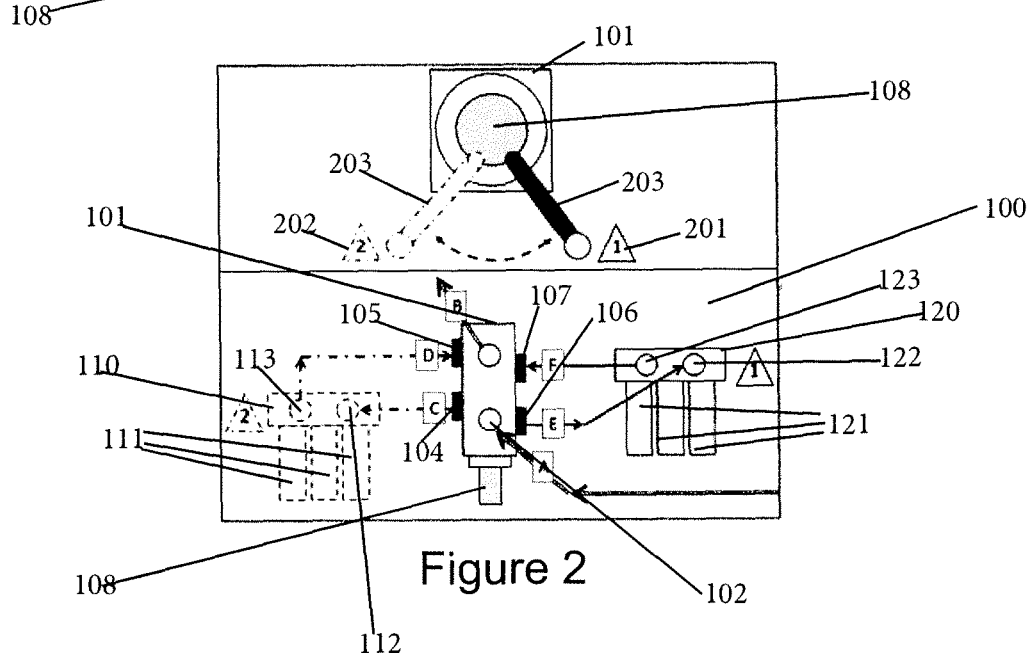
FIG. 2 is an exemplary schematic of an operating condition of the fuel filtration system of FIG. 1.

FIG. 2 is a schematic of an operating condition of the fuel filtration system of FIG. 1, in accordance with example embodiments. The selector valve 101 is configured to selectably fluidly couple one of the first or second fuel filter heads 110 and 120 to the primary valve outlet port 103 by moving the valve actuator 108 between a first position 201 and a second position 202, for example via an external lever 203 of the valve actuator 108. The selector valve 101 is configured for selectably fluidly coupling one of the first or second fuel filter heads 110 and 120 to the primary valve outlet port 103 by moving a valve body positioned in the selector valve 101. In example embodiments, the valve actuator 108 does not include the external lever 203.

In particular embodiments, the valve actuator 108 is electronically controlled to move between the first position 201 and the second position 202. In the first position 201, the valve actuator 108 fluidly couples the second fuel filter head 120 to the primary valve outlet port 103 and fluidly decouples or isolates the first fuel filter head 110 from the primary valve outlet port 103. When the valve actuator 108 decouples or isolates the first fuel filter head 110 from the primary valve outlet port 103, the valve actuator 108 blocks the flow of fuel from fuel filtration inlet 107 to the primary valve outlet port 103 and/or blocks the flow of fuel into fuel filtration outlet 106 from the primary valve inlet port 102. In the second position 202, the valve actuator 108 fluidly couples the first fuel filter head 110 to the primary valve outlet port 103 and fluidly decouples or isolates the second fuel filter head 120 from the primary valve outlet port 103. When the valve actuator 108 decouples or isolates the second fuel filter head 120 from the primary valve outlet port 103, the valve actuator 108 blocks the flow of fuel from a fuel filtration inlet 105 to the primary valve outlet port 103 and/or blocks the flow of fuel into the fuel filtration outlet 104 from the primary valve inlet port 102. In particular embodiments, the selector valve 101 includes a low-pressure drop double selector valve configured to move between the first position and the second position without a substantial loss of fuel pressure to the primary valve outlet port 103. Accordingly, if one of the fuel filters 111, 121 becomes clogged, for example due to poor fuel quality, or a related component such as the fuel filter heads or a fuel filter line fail, the other one of the fuel filters that is operational may be brought online to continue fuel filtration without requiring an engine shutdown.

Figure 3:
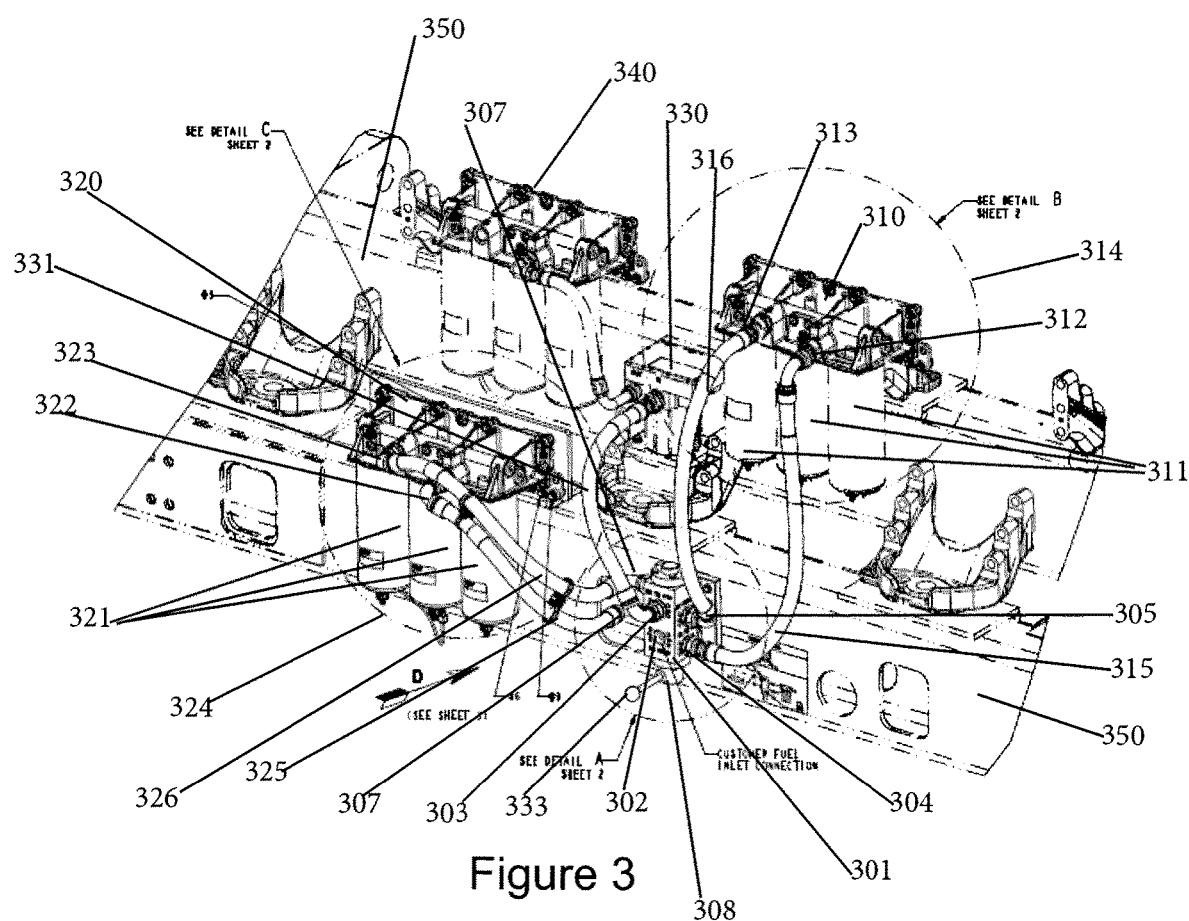
FIG. 3 shows a fuel filtration system coupled to internal combustion engine, in accordance with example embodiments.

FIG. 3 shows a fuel filtration system coupled to internal combustion engine, in accordance with example embodiments. A fuel filtration system 300 is mounted to an internal combustion engine 350. The fuel filtration system 300 includes a selector valve 301, a first fuel filter bank 314, and a second fuel filter bank 324. The selector valve 301 is configured to selectably fluidly couple the first fuel filter bank 314 and the second fuel filter bank 324 to the primary valve outlet port 303 of the selector valve 301 and thereby place at least one of the first and second fuel filter banks 314, 324 in fluid communication with an electronic fuel transfer pump 330 fluidly coupled to the primary valve outlet port 303. As one of skill in the art would recognize, in other arrangements, a mechanical fuel transfer pump may be used in lieu of the electronic fuel transfer pump 330. The first fuel filter bank 314 includes a first fuel filter head 310 fluidly coupled to first set of fuel filters 311. The first fuel filter head 310 includes a first fuel filter head inlet 312. A first fuel filter line 315 couples the first fuel filter head inlet 312 to a first fuel filtration outlet 304 of the selector valve 301. The first fuel filtration outlet 304 is in fluid communication with a primary valve inlet port 302.

In particular embodiments, the first fuel filtration outlet 304 is selectively coupled to the primary valve inlet port 302. The fuel filter line 315 permits fuel (e.g., diesel fuel) that is pumped into the selector valve 301 via the primary valve inlet port 302 to be transferred into the first fuel filter head 310, which guides the fuel through the fuel filters 311 for filtration. In particular embodiments, the first fuel filter head 310 is configured to guide the fuel through the first set of fuel filters 311 in series. In particular embodiments, the first fuel filter head 310 is configured to guide the fuel through the fuel filters 311 in parallel. Once the fuel traverses one or more of the first set of fuel filters 311, the fuel is pumped out of a fuel filter head outlet 313, through fuel filter line 316, and back into the selector valve 301 via a fuel filtration inlet 305. The fuel pumped back into the selector valve 301 via the fuel filtration inlet 305 from the filter bank 314 is pumped out of the selector valve 301 through the primary valve outlet port 303 where it is transmitted via a fuel filter line 331 to the electronic fuel transfer pump 330. In particular embodiments, the electronic fuel transfer pump 330 pumps the filtered fuel to a second stage filtration bank 340 where the fuel is further filtered before being transmitted to a fuel line of the internal combustion engine 350. Although embodiments described herein are described in a stage 1 fuel filtration implementation, where the fuel is filtered from the fuel supply tank before being transferred to a second stage of filtration, i.e., the second stage filtration bank 340, example embodiments of the fuel filtration system 300 described herein may be adapted for other stages of fuel filtration.

The selector valve 301 is configured to modulate between the first and second fuel filter banks 314 and 324. The selector valve 301 is configured to selectably fluidly couple one of the first and second fuel filter heads 310 and 320 to the primary valve outlet port 303 by moving a valve actuator 308 between a first position and a second position, for example via an external lever 333 of the valve actuator 308. The selector valve 301 may be reconfigured, to disconnect the fuel filter bank 314 from fluid communication with the primary valve outlet port 303 and thereby connect the fuel filter bank 324 to the primary valve outlet port 303. The fuel filter bank 324, like the fuel filter bank 314 includes a second fuel filter head 320 fluidly coupled to second set of fuel filters 321. The second fuel filter head 320 includes a fuel filter head inlet 322. A fuel filter line 325 couples the fuel filter head inlet 322 to a fuel filtration outlet 306 of the selector valve 301.

The fuel filtration outlet 306 is in fluid communication with the primary valve inlet port 302. In particular embodiments, the fuel filtration outlet 306 is selectively coupled to the primary valve inlet port 302. The fuel filter line 325 permits transfer of fuel, such as diesel fuel, pumped into the selector valve 301 via the primary valve inlet port 302, to be transferred into the second fuel filter head 320, which guides the fuel through the fuel filters 321 for filtration. In particular embodiments, the second fuel filter head 320 is configured to guide the fuel through the fuel filters 321 in series. In particular embodiments, the second fuel filter head 320 is configured to guide the fuel through the fuel filters 321 in parallel. Once the fuel traverses one or more of the fuel filters 321, the fuel is pumped out of a fuel filter head outlet 323, through a fuel filter line 326, and back into the selector valve 301 via a fuel filtration inlet 307. The fuel pumped back into the selector valve 301 via the fuel filtration inlet 307 from the filter bank 324 is pumped out of the selector valve 301 through the primary valve outlet port 303 where it is transmitted via the fuel filter line 331 to the electronic fuel transfer pump 330.

Figure 4:
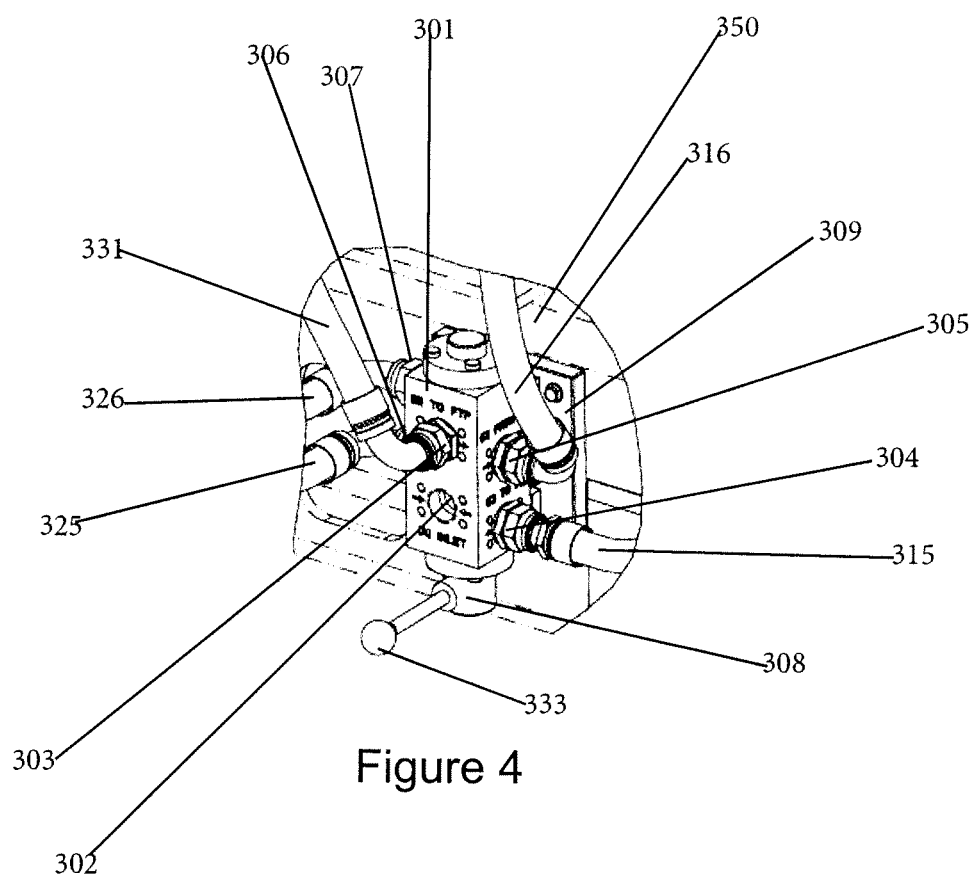
FIG. 4 is a magnified view of the selector valve of the fuel filtration system of FIG. 2.

In the embodiment depicted more particularly in FIG. 4, the selector valve 301 is coupled to the internal combustion engine 350 via a mounting bracket 309. The fuel filter banks 314, 324 are coupled to the internal combustion engine 350 via fuel filter head mounting brackets 319, 329 respectively. The fuel filter head mounting brackets 319, 329 may include one or more vibration isolators to reduce the vibrations received by fuel filters banks 314, 324 and transmitted by internal combustion engine 350.

Figure 5:
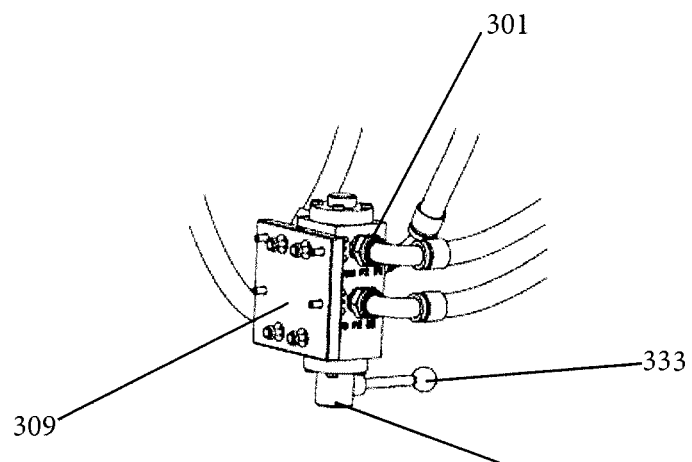
FIG. 5 is a rear perspective view of the selector valve of FIG. 4.

FIG. 4 is a magnified view of the selector valve of the fuel filtration system of FIG. 2. FIG. 5 is a rear perspective view of the selector valve of FIG. 4. The selector valve 301 includes a low-pressure drop double selector valve configured to move between the first position and the second position without a substantial loss of fuel pressure to the primary valve outlet port 303.

Figure 6:
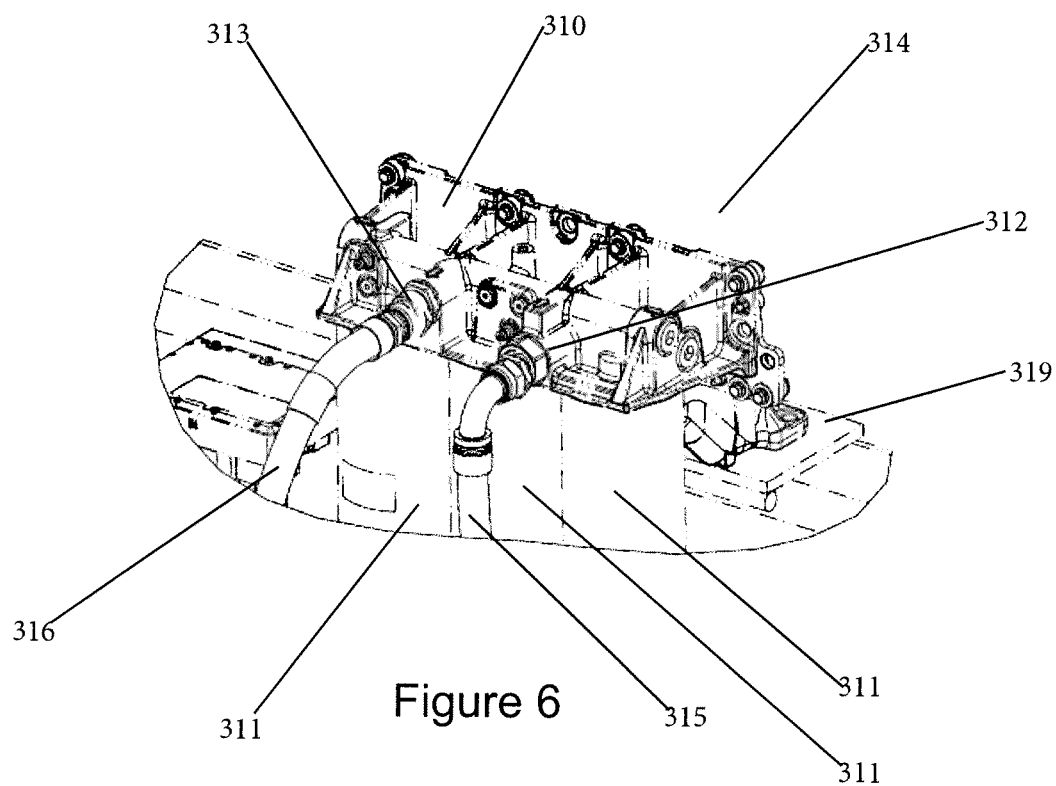
FIG. 6 is a magnified view of the fuel head of the fuel filtration system of FIG. 3.

FIG. 6 is a magnified view of the fuel head of the fuel filtration system of FIG. 3. The first and second fuel filter heads 310, 320 may be composed, in whole or in part, of one of cast iron and steel, in particular embodiments. The fuel filter lines 315, 316 and 325, 326 may include an elastomer tube having swivel crimped couplers disposed on their ends.

Figure 7:
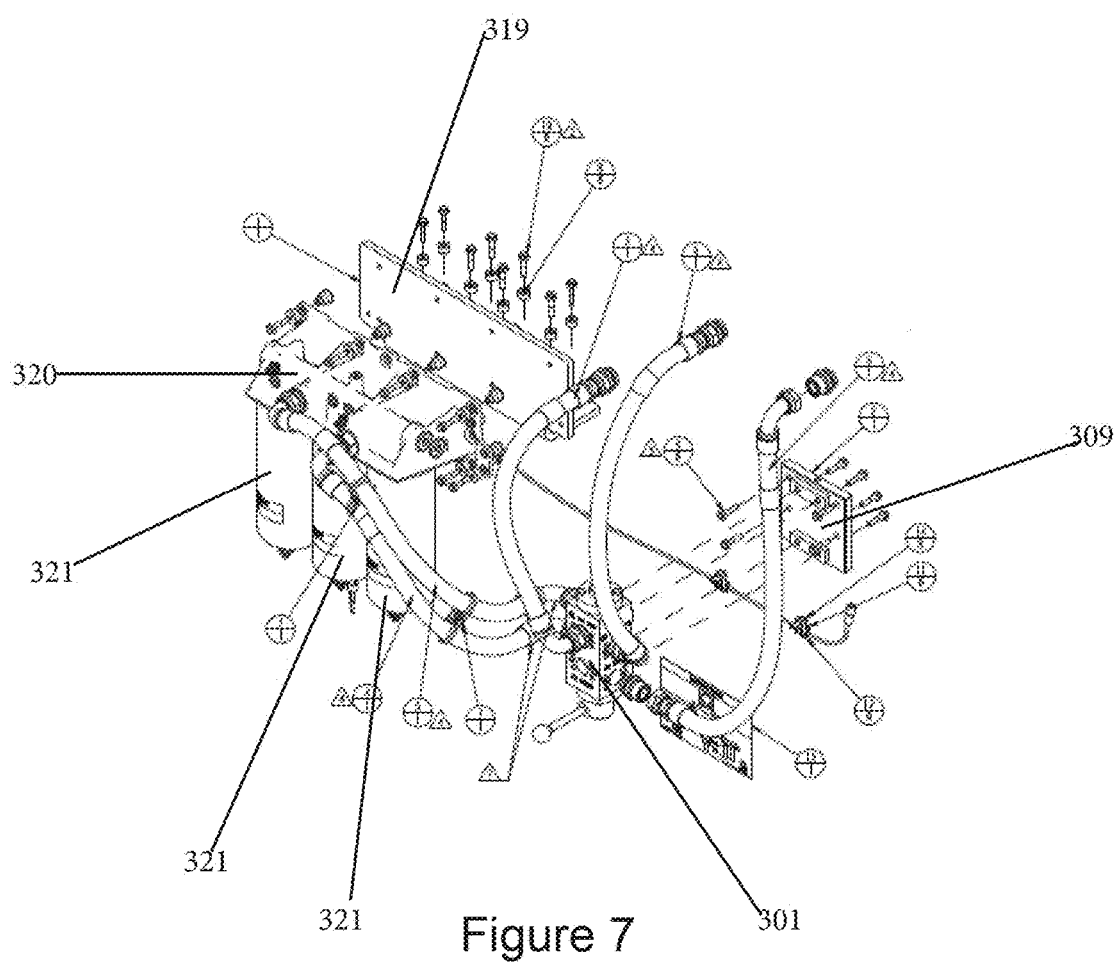
FIG. 7 is an exploded view of the fuel filter and selector valve of the fuel filtration system of FIG. 3.

FIG. 7 is an exploded view of the fuel filter and selector valve of the fuel filtration system of FIG. 3. As shown in FIG. 5, the mounting bracket 309 is coupled to the back of the selector valve 301, for example via one or more fasteners. The mounting bracket may be configured for mounting to the internal combustion engine, for example via one or more fasteners and one or more alignment pins. In particular embodiments, the mounting bracket 309 may include one or more vibration isolators.

One advantage of the fuel filtration system embodiments described herein is the system's modularity. In accordance with example embodiments, major components of the fuel filtration system, such as the first and second fuel filter heads 310, 320 and the selector valve 301, are separable components, as demonstrated in FIG. 7. The modularity of the system is advantageous in that it allows the system to be easily modified to fit a wide range of engine applications and installations. Additionally, this modularity permits replacement of individual components—rather than the entire system—should any one of the components malfunction or become damaged. Other benefits afforded by the modularity of the fuel filtration system include the ability to implement the fuel filtration system to switch between different fuel supplies and different fuel types.

Figure 8:
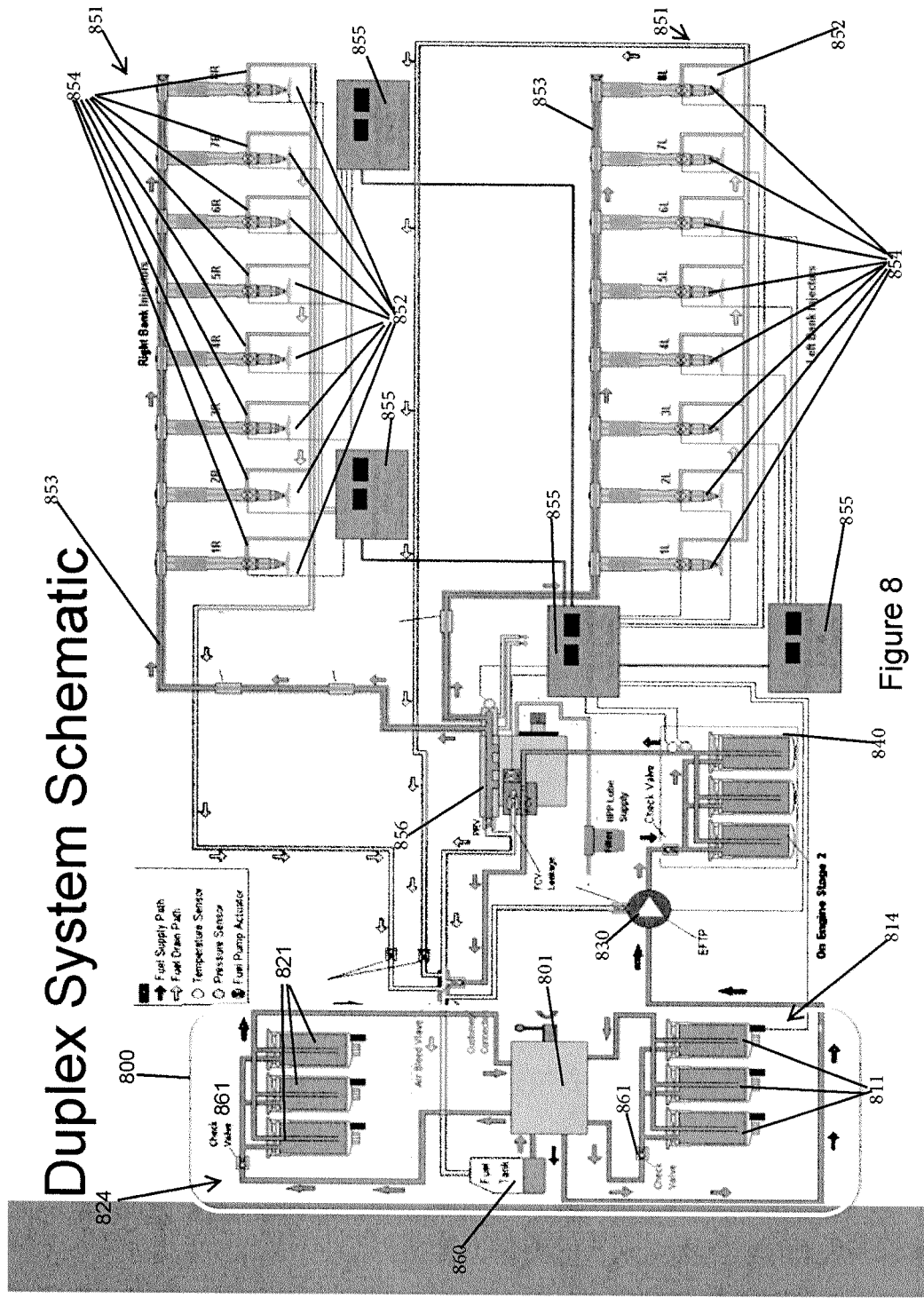
FIG. 8 is a schematic of the fuel filtration system, in accordance with example embodiments.

FIG. 8 is a schematic of the fuel filtration system, in accordance with a particular embodiment. A fuel filtration system 800 is coupled to an internal combustion engine 850, in accordance with example embodiments. The internal combustion engine 850 includes a plurality of cylinder banks 851, each including a plurality of cylinders 852. Each of the plurality of cylinders 852 includes a fuel injector 854 in fluid communication with a fuel rail 853. As demonstrated in FIG. 8, the internal combustion engine 850 may also include one or more controllers 855 in electrical communication with the fuel injectors 854 to meter the flow of fuel through the fuel injectors 854. The one or more controllers 855 may include one or more sensors to detect the performance of the fuel injectors and to monitor the various properties such as flow-rate or pressure of flow through the fuel rails 853. The fuel rails 853 receive fuel pumped by an electronic fuel transfer pump 830 from fuel tank 860. The electronic fuel transfer pump 830 pumps fuel filtered by one of fuel filter banks 814 and 824 to the fuel rail 853.

The electronic fuel transfer pump 830 pumps filtered fuel through a second stage of filtration via secondary filtration system 840 before causing the fuel to be transmitted to the fuel rails 853. The electronic fuel transfer pump 830 is coupled to a valve 801 (e.g., a selector valve). The valve 801 is configured to select one of the filter banks 814 and 824 for filtration of fuel from the fuel tank 860. If, for example, the filter bank 814 is active or selected for filtration of fuel from the fuel tank 860 via the valve 801 and the filter bank 824 is inactive and isolated from the electronic fuel transfer pump 830 via the valve 801, the filter 824 may be activated to filter the fuel if the filter bank 814 malfunctions. The malfunctioning filter bank 814 may be decoupled from the electronic fuel transfer pump 830 via the valve 801 when the inactive filter bank 824 is activated.

As shown in FIG. 8, the one or more controllers 855 may be coupled to the filter banks 814, and 824 to determine the operational state of the filter bank. For example, the one or more controllers 855 may be electrically coupled to pressure sensors positioned in the filter banks 814, and 824. If the fluid pressure in the filter banks 814, and 824 is determined to exceed a predetermined threshold a malfunction signal for the filter bank may be generated. The malfunction signal may produce an alarm and/or may be used to electronically reconfigure the valve 801 to switch filter banks. In various arrangements, the one or more controllers 855 may be associated with various other types of sensors to detect corresponding conditions warranting the use of a different filter bank (e.g., a sensor disposed in a water/fuel separator configured to determine when the water/fuel separator is full).

As shown in FIG. 8, the filter banks 814, 824 may include a plurality of fuel filters 811, and 821 respectively. In particular embodiments, the fuel filters 811, 821 are 5 micron fuel filters, although other rated fuel filters could also be used depending upon the particular system requirements. Additionally, the internal combustion engine 850 may include other components, including, but not limited to, a positive crankcase ventilation system 856, and a pressure regulator 857.

Figure 9:
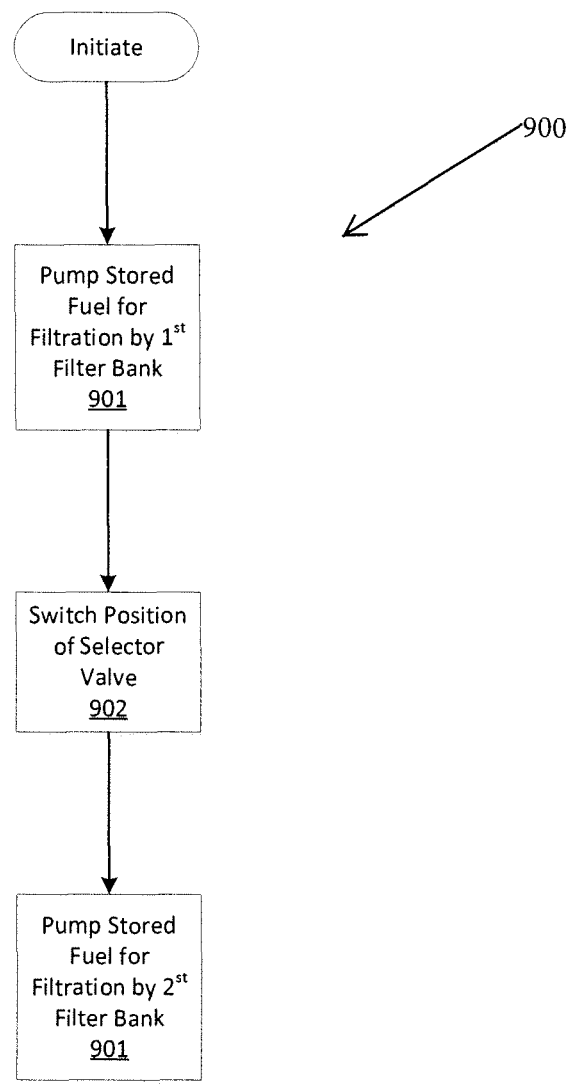
FIG. 9 is flow diagram of a control system for operating a fuel filtration system, in accordance with example embodiments.

FIG. 9 is flow diagram of a control system for a fuel filtration system, in accordance with example embodiments. A control system 900, in accordance with example embodiments, causes fluid pumped from a fuel tank to be filtered at 901 by a first filter bank and transmitted out of a valve to internal engine component. At 902, the control system 900 switches a position of the valve from a first position to a second position. At 903, the control system 900 causes fluid pumped from the fuel tank to be filtered by a second filter bank and transmitted out of the valve to the internal combustion engine component.

In certain embodiments, the control system 900 further includes a controller structured to perform certain operations to modulate filter banks. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes a sensor module configured to determine a condition of a filter bank and an actuation module configured to move a valve between a first position and a second position in response to the determined condition of the filter bank. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 9.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

In the claims, as well as in the specification above, all transitional phrases such as "comprising," "including," "carrying," "having," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A fuel filtration system, comprising:
a first stage filtration bank, comprising:
a first fuel filter head fluidly coupled to a plurality of first fuel filters; and
a second fuel filter head fluidly coupled to a plurality of second fuel filters, the second fuel filter head separable from the first fuel filter head and mounted so as to be spaced from the first fuel filter head;
a fuel transfer pump downstream from the first stage filter bank;
a second stage filtration bank fluidly coupled to the fuel transfer pump;
a double selector valve coupled to the first fuel filter head and the second fuel filter head and configured to modulate flow between the plurality of first fuel filters and the plurality of second fuel filters, the double selector valve separable from the first fuel filter head and the second fuel filter head, the double selector valve including:
a valve housing comprising a bore, the valve housing defining:
a primary valve inlet port,
a primary valve outlet port fluidly coupled to the fuel transfer pump via a fuel filter line,
a first fuel filtration outlet fluidly coupled to an inlet of the first fuel filter head via a first fuel inlet line,
a first fuel filtration inlet fluidly coupled to an outlet of the first fuel filter head via a first fuel outlet line,
a second fuel filtration outlet fluidly coupled to an inlet of the second fuel filter head via a second fuel inlet line,
a second fuel filtration inlet fluidly coupled to an outlet of the second fuel filter head via a second fuel outlet line;
an elongated body positioned within the bore of the valve housing, the elongated body comprising an exposed portion protruding outwardly from a first end of the valve housing, the elongated body movable from
a first position in which the elongated body fluidly couples (i) the first fuel filtration outlet to the primary valve inlet port while blocking flow to the second fuel filtration outlet, and (ii) the first fuel filtration inlet to the primary valve outlet port while blocking flow to the second fuel filtration inlet to
a second position in which the elongated body fluidly couples (i) the second fuel filtration outlet to the primary valve inlet port while blocking flow to the first fuel filtration outlet, and (ii) the second fuel filtration inlet to the primary valve outlet port while blocking flow to the first fuel filtration inlet; and
a single actuator coupled to the exposed portion of the elongated body to move the elongated body between the first position and the second position, the elongated body configured to move between the first position and the second position so as to bring the second fuel filter head online to permit fuel filtration to continue without requiring an engine shutdown.

2. The fuel filtration system of claim 1, further comprising:
a plurality of sensors; and
a controller in communication with the single actuator and the plurality of sensors, wherein the controller is structured to actuate the double selector valve in response to input from at least one of plurality of sensors.

3. The fuel filtration system of claim 2, wherein the plurality of sensors are pressure sensors; and wherein the controller moves the double selector valve in response to a change in a fuel pressure above a pre-determined threshold.

4. The fuel filtration system of claim 1, wherein the elongated body is movable to a third position fluidly coupling the first fuel filter head and the second fuel filter head to the primary valve outlet port.

5. The fuel filtration system of claim 1, wherein at least one of the plurality of first fuel filters or the plurality of second fuel filters is disposed in series.

6. The fuel filtration system of claim 1, wherein at least one of the plurality of first fuel filters or the plurality of second fuel filters is disposed in parallel.

7. The fuel filtration system of claim 1, further comprising:
a valve mounting bracket coupled to the double selector valve;
a first fuel filter head mounting bracket coupled to the first fuel filter head; and
a second fuel filter head mounting bracket coupled to the second fuel filter head, the second fuel filter head mounting bracket separable from the first fuel filter head mounting bracket.

8. The fuel filtration system of claim 7, further comprising an internal combustion engine coupled to the valve mounting bracket, the first fuel filter head mounting bracket, and the second fuel filter head mounting bracket.

9. The fluid filtration system of claim 8, further comprising a vibration isolator at one or more of the valve mounting bracket, the first fuel filter head mounting bracket, and the second fuel filter head mounting bracket.

10. A fuel filtration system, comprising:
a first stage filtration bank, comprising:
a first fuel filter head fluidly coupled to a plurality of first fuel filters;
a first pressure sensor associated with the first fuel filter head;
a second fuel filter head fluidly coupled to a plurality of second fuel filters, the second fuel filter head separable from the first fuel filter head and mounted so as to be spaced from the first fuel filter head; and
a second pressure sensor associated with the second fuel filter head, wherein the first pressure sensor is configured to cause a malfunction signal to be generated when the pressure in the first fuel filter head exceeds a threshold value, and the second pressure sensor is configured to cause the malfunction signal to be generated when the pressure in the second fuel filter head exceeds the threshold value;
a fuel transfer pump downstream from the first stage filter bank;
a second stage filtration bank fluidly coupled to the fuel transfer pump;
a double selector valve coupled to the first fuel filter head and the second fuel filter head and configured to modulate flow between the plurality of first fuel filters and the plurality of second fuel filters, the double selector valve separable from the first fuel filter head and the second fuel filter head, the double selector valve including:
a valve housing comprising a bore, the valve housing defining:
a primary valve inlet port,
a primary valve outlet port fluidly coupled to the fuel transfer pump via a fuel filter line,
a first fuel filtration outlet fluidly coupled to an inlet of the first fuel filter head via a first fuel inlet line,
a first fuel filtration inlet fluidly coupled to an outlet of the first fuel filter head via a first fuel outlet line,
a second fuel filtration outlet fluidly coupled to an inlet of the second fuel filter head via a second fuel inlet line,
a second fuel filtration inlet fluidly coupled to an outlet of the second fuel filter head via a second fuel outlet line;
an elongated body positioned within the bore of the valve housing, the elongated body comprising an exposed portion protruding outwardly from a first end of the valve housing, the elongated body configured to selectably fluidly couple at least one of the first filter head or the second fuel filter head to the primary valve outlet port; and
a single valve actuator coupled to the exposed portion of the elongated body and configured to actuate the elongated body, the elongated body configured to move between the first position and the second position so as to bring the second fuel filter head online to permit fuel filtration to continue without requiring an engine shutdown.

11. The fuel filtration system of claim 10, further comprising a controller in communication with the single valve actuator and structured to actuate the double selector valve in response to input from at least one of first pressure sensor or the second pressure sensor.

12. The fuel filtration system of claim 1, wherein the plurality of first fuel filters and the plurality of second fuel filters are 5 micron fuel filters.

13. The fuel filtration system of claim 1, wherein the fuel transfer pump is configured to deliver fuel to an engine, and wherein the elongated body is configured to move between the first position and the second position while maintaining approximately constant fuel flow to the engine.

14. The fuel filtration system of claim 2, wherein at least one of the plurality of first fuel filters and at least one of the plurality of second fuel filters includes a water-fuel separator, wherein the plurality of sensors are water-in-fuel sensors, and wherein the controller moves the double selector valve in response to an indication from at least one of the plurality of sensors that the water-fuel separator is full.

* * * * *